United States Patent
Kumar et al.

(10) Patent No.: US 11,876,188 B2
(45) Date of Patent: Jan. 16, 2024

(54) ELECTROLYTE FOR USE IN SODIUM-SULFUR BATTERIES

(71) Applicant: Agency for Science, Technology and Research, Singapore (SG)

(72) Inventors: Vipin Kumar, Singapore (SG); Zhi Wei Seh, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 0 days.

(21) Appl. No.: 17/773,568

(22) PCT Filed: Oct. 26, 2020

(86) PCT No.: PCT/SG2020/050613
§ 371 (c)(1),
(2) Date: Apr. 29, 2022

(87) PCT Pub. No.: WO2021/086264
PCT Pub. Date: May 6, 2021

(65) Prior Publication Data
US 2022/0367923 A1    Nov. 17, 2022

(30) Foreign Application Priority Data

Oct. 29, 2019    (SG) ............................ 10201910055R

(51) Int. Cl.
*H01M 10/00* (2006.01)
*H01M 10/39* (2006.01)
*H01M 4/38* (2006.01)

(52) U.S. Cl.
CPC ....... *H01M 10/3927* (2013.01); *H01M 4/381* (2013.01); *H01M 2300/0028* (2013.01)

(58) Field of Classification Search
CPC .... H01M 10/0567; H01M 4/362; H01M 4/13; H01M 10/054; H01M 4/381; Y02E 60/10
See application file for complete search history.

(56) References Cited

U.S. PATENT DOCUMENTS

| | | | |
|---|---|---|---|
| 2007/0154814 A1 | 7/2007 | Ryu | |
| 2010/0062327 A1* | 3/2010 | Li | H01M 10/26 429/105 |
| 2019/0067730 A1* | 2/2019 | Archer | H01M 10/0567 |

FOREIGN PATENT DOCUMENTS

| | | | |
|---|---|---|---|
| CN | 111261938 A | 6/2020 | |
| KR | 2009/0067384 A | * 12/2007 | ............ H01M 10/08 |

OTHER PUBLICATIONS

Yonemaru, et al. Additives for Electrolyte Solution of Storage Battery, and Method for Preparing the Same, See the Abstract Jun. 2009 (2009).*

(Continued)

*Primary Examiner* — Cynthia H Kelly
*Assistant Examiner* — Monique M Wills
(74) *Attorney, Agent, or Firm* — Womble Bond Dickinson (US) LLP

(57) ABSTRACT

The present disclosure relates to an electrolyte comprising: a) a sodium salt; b) an additive comprising at least one additional metallic/metalloid cation having a standard reduction potential which is at least 2.5V more positive than that of sodium cation; wherein said sodium salt and said additive are dispersed in a solvent comprising at least one alkyl carbonate, and wherein the concentration of said metallic/metalloid cation in the electrolyte is 15 mM to 250 mM. The present disclosure also relates to a sodium-sulfur cell comprising a sodium anode, a microporous sulfur cathode, and the electrolyte as described herein. The present disclosure further provides a method of improving cycling life of a sodium-sulfur cell, wherein the sodium-sulfur cell (Continued)

comprising a sodium anode, a sulfur cathode, and an electrolyte containing a sodium salt dispersed in an alkyl carbonate solvent.

19 Claims, 13 Drawing Sheets

(56) References Cited

OTHER PUBLICATIONS

Zheng, Xueying et al., "Toward a Stable Sodium Metal Anode in Carbonate Electrolyte: A Compact, Inorganic Alloy Interface," The Journal of Physical Chemistry, vol. 10, No. 4, Jan. 29, 2019, pp. 707-714.
Lee, Hwon-gi et al., "Improving the Stability of an RT-NaS Battery via In Situ Electrochemical Formation of Protective SEI on a Sulfur-Carbon Composite Cathode," Adv. Sustainable Syst., 1800076, 6 pages.
International Search Report for International Application No. PCT/SG2020/050613 dated Dec. 31, 2020, 3 pages.
Written Opinion for International Application No. PCT/SG2020/050613 dated Dec. 31, 2020, 6 pages.
International Preliminary Report on Patentability for International Application No. PCT/SG2020/050613 dated May 3, 2022, 8 pages.
Written Opinion for Singapore Application No. 11202204120S dated Oct. 4, 2023, 8 pages.

\* cited by examiner

ELECTROLYTE FOR USE IN SODIUM-SULFUR BATTERIES

CROSS-REFERENCE TO RELATED APPLICATIONS

This application is a US national phase application under 35 USC 371 of international application no. PCT/SG2020/050613, filed 26 Oct. 2020, which claims the benefit of priority of Singapore patent application No. 10201910055R, filed on 29 Oct. 2019, the contents of which were incorporated by reference in the entirety.

TECHNICAL FIELD

The present invention relates to sodium-based electrochemical cells, particularly electrolytes for assembly of sodium-based electrochemical cells.

BACKGROUND

Technological advancement in pocket sized devices has created a demand for energy storage materials which are able to sustain battery capacity and energy density throughout the lifetime of the device. Lithium ion technology has led this field for several years and has been relied on heavily for the fabrication of batteries for electronic devices. However, due to the limited availability of lithium in the Earth's crust, there is a need for alternative energy storage means.

Room temperature sodium-sulfur batteries have been proposed as promising alternatives to lithium ion batteries, largely due to the natural abundance of elements required for such batteries. However, advancement of this technology has been hindered by the inherent instability of the sodium electrodes in such batteries. The occurrence of localized electrochemical reactions in the vicinity of the sodium electrode often result in the depletion of the sodium electrode. In addition, the presence of parasitic reactions leads to an unstable interphase at the sodium electrode. As such, the performance of sodium-sulfur batteries has been regarded to be poorer and less stable as compared to their lithium counterparts.

As such, there is a need for a means to overcome or at least ameliorate the problems described above. It is an object of the present disclosure to provide a means for stabilizing sodium-based electrochemical cells while not compromising on the energy storing capability of the electrochemical cell. Other desirable features and characteristics will become apparent from the subsequent detailed description and the appended claims, taken in conjunction with the drawings and this background of the disclosure.

SUMMARY OF INVENTION

In one aspect of the present disclosure, there is provided an electrolyte comprising: a) a sodium salt; b) an additive comprising at least one additional metallic/metalloid cation having a standard reduction potential which is at least 2.5V more positive than that of sodium cation; wherein said sodium salt and said additive are dispersed in a solvent comprising at least one alkyl carbonate, and wherein the concentration of said metallic/metalloid cation in the electrolyte is 15 mM to 250 mM.

The disclosed electrolyte may be used in a lithium-sulfur battery. Advantageously, the presence of additives comprising a metallic/metalloid cation having a standard reduction potential which is at least 2.5V more positive than that of sodium cation may aid and/or participate in the formation of an alloy with a sodium anode in an electrolytic cell. The formation of the alloy may further stabilize the solid-electrolyte interphase at the sodium anode, leading to an improvement on battery performance and extended battery life.

Further advantageously, the electrolytic cells comprising the electrolyte as described herein demonstrate a sustained, high Coulombic efficiency of about 98% and an improved cycling lifespan. In particular, it was found that electrolytic cells which comprise the electrolyte as described herein may have an improved stable cycling lifespan of 800-1000 cycles. The present electrolyte also demonstrates stable cycling behavior for at least 300 hours at high current densities of 1 mA/cm$^2$ and 1 mAh/cm$^2$.

Without being bound to theory, the addition of the metallic/metalloid cation at a concentration of 15 mM to 250 mM in the electrolyte may enable the in situ formation of a sodium alloy. Advantageously, the in situ formation of the sodium alloy may avoid the need for complex inert reaction conditions and high temperatures of more than 500° C. which were previously used in the art to form a sodium alloy anode.

In another aspect of the present disclosure, there is provided a sodium-sulfur cell comprising a sodium anode, a microporous sulfur cathode, and the electrolyte as described herein.

In yet another aspect of the present disclosure, there is provided a method of improving cycling life of a sodium-sulfur cell, wherein the sodium-sulfur cell comprising a sodium anode, a sulfur cathode, and an electrolyte containing a sodium salt dispersed in an alkyl carbonate solvent, the method comprising the step of introducing one or more additives into said electrolyte, each additive independently capable of forming a sodium alloy interphase on a surface on the sodium anode; and wherein the one or more additives independently comprise a one metal or metalloid cation having a standard reduction potential which is at least 2.5V more positive than that of sodium cation.

DEFINITIONS

The "standard reduction potentials", as used herein, refers to the tendency of a specific ionic species to gain electrons and be reduced, relative to the standard hydrogen electrode, which is given a reduction potential of 0.00 V. These potentials are measured under standard conditions: a temperature of 298.15 K, an effective concentration of 1 M for each aqueous species, a partial pressure of 1 atm. Ionic species which have a more positive reduction potential may gain an electron more easily than hydrogen.

The term "stable", "stability" and grammatical variants thereof, in the context of this specification, refers to an electrode that can be operated with no sign of short circuiting and/or without experiencing sudden fluctuations in voltage or current or capacity.

The term "cycle life" as used in the context of the present specification may refer to the total number of charge/discharge cycles the battery is able to undergo before loss of more than 20% of its original capacity.

The term "interphase" as used herein refers to a thin region where two distinct chemical phases stabilize themselves.

The term "C" as used herein refers to "C-rates". C-rate is a measure of the rate at which a battery is being charged or discharged. It is defined as the current through the battery divided by the theoretical current draw under which the battery would deliver its nominal rated capacity in one hour.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and subgeneric groupings falling within the generic disclosure also form part of the disclosure. This includes the generic description of the embodiments with a proviso or negative limitation removing any subject matter from the genus, regardless of whether or not the excised material is specifically recited herein.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. Exemplary, non-limiting embodiments of a carbonized composite for electrochemical cell electrodes, will now be disclosed.

The electrolyte as disclosed herein may comprise a sodium salt: a) a sodium salt; b) an additive comprising at least one additional metallic/metalloid cation having a standard reduction potential which is at least 2.5V more positive than that of sodium cation; wherein said sodium salt and said additive are dispersed in a solvent comprising at least one alkyl carbonate, and wherein the concentration of said metallic/metalloid cation in the electrolyte is 15 mM to 250 mM.

The metallic/metalloid cation may possess a standard reduction potential which is at least 2.5V more positive than that of sodium cation. In one embodiment, the metallic/metalloid cation has a standard reduction potential which is at least 2.5-5.0 V, or 2.5-4.5 V, or 2.5-4.0 V, or 2.6-4.0 V, or 2.7-4.0 V, or 2.8-4.0 V, or 2.9-4.0 V, or 3.0-4.0 V, or 3.1-4.0 V, or 3.2-4.0 V, or 3.3-4.0 V, or 3.4-4.0 V, or 3.5-4.0 V, or 3.5-3.9 V, or 3.5-3.8 V, or 3.5-3.7 V, or 3.5-3.6V more positive than that of sodium cation.

Advantageously, the metallic/metalloid cations that have sufficiently positive reduction potential than that of sodium cation may be selectively reduced at the sodium anode surface. Without being bound to theory, the positive reduction potential of the metallic/metalloid cation in the additive may result in a favorable Gibbs free energy, enabling the spontaneous reduction of the metallic/metalloid cation to form an alloy at the sodium anode. Advantageously, the sodium alloy on the surface of the sodium anode may form a solid-electrolyte interphase, facilitating the diffusion of ionic species while protecting the metal anode from parasitic reactions and dendritic formations.

The metallic/metalloid element of said metallic/metalloid cation may be selected from Groups 10 to 15, preferably Groups 11, 14 and 15 of the Periodic Table of Elements.

In one embodiment, the metallic/metalloid element is selected from Group 11 of the Periodic Table of Elements. Preferably, the metallic/metalloid element may be selected from the group consisting of silver, gold, and copper. More preferably, the metallic/metalloid cation may be a silver cation.

In another embodiment, the metallic/metalloid element is selected from Groups 14 and 15 of the Periodic Table of Elements. Preferably, the metallic/metalloid cation may comprise a metal/metalloid element selected from the group consisting of tin, lead, arsenic, antimony, and bismuth. More preferably, the metallic/metalloid cation may comprise a metal/metalloid element selected from the group consisting of tin, antimony, and bismuth. Most preferably, the metallic/metalloid cation may be a tin cation.

Advantageously, the inclusion of the metallic/metalloid cation in the electrolyte was found to exert a positive effect on the charge and discharge rate of the electrolytic cell. Specifically, sodium anode cells which comprise the electrolyte described herein were found to maintain a specific capacity about 450-500 mAh/g at a charge/discharge rate of 5 C, after 200 cycles; about 260-320 mAh/g at a charge/discharge rate of 7 C after 200 cycles; and about 130-240 mAh/g at a charge/discharge rate of 10 C after 200 cycles. This may represent an improvement of at least 10% compared to batteries which comprise an electrolyte without the metallic/metalloid cation.

The concentration of the metallic/metalloid cation in the electrolyte may be 15 mM to 250 mM. In one embodiment, the concentration of the metallic/metalloid cation in the electrolyte is 15 mM to 200 mM, or 15 to 150 mM, or 15 mM to 140 mM, or 15 mM to 130 mM, or 15 mM to 120 mM, or 15 mM to 110 mM. Preferably, the concentration of the metallic/metalloid cation in the electrolyte may be 20 mM to 100 mM.

It was surprisingly found that the provision of an electrolyte comprising a metallic/metalloid cation at a concentration of 20 mM to 100 mM may be optimal for achieving long term cycling stability of electrolytic cells. In particular, sodium sulfur cells comprising electrolytes with 20 mM to 100 mM of the metallic/metalloid cation as described herein can be observed to retain a high Coulombic efficiency of about 98-99.5% and a specific capacity of about 62%, even after 600-800 cycles.

This is a marked improvement over the performance of comparable Li—S batteries comprising an electrolyte wherein the additional metallic/metalloid cation is absent, which demonstrate a gradual decrease in specific capacity after about 400 cycles.

It is postulated that the ability of the sodium battery to maintain its Coulombic efficiency after 600-800 cycles; and specific capacity at high charge/discharge rates after 200 cycles may be attributed to the formation of an alloy phase by the metal cation and sodium, on the surface of the sodium anode. This "alloy phase" may protect the sodium anode from corrosion and facilitate the diffusion of ionic species to the surface of the anode. These combined effects contribute to the Coulombic efficiency and stability of the sodium anode battery.

In a preferred embodiment, the electrolyte comprises a silver cation at a concentration of 100 mM. Advantageously, the electrolytic cell with said $Ag^+$-containing electrolyte additive were found to function stably for over 800 cycles with 62% capacity retention. An average Coulombic efficiency of about 98.4% was observed at 800 cycles. The rate-behaviour of the cell was also observed to be improved, where the cell can be operated stably for over 200 cycles even at extremely high C-rate, for instance, 5 C, 7 C and 10 C.

In another embodiment, the electrolyte comprises a tin cation as additive at a concentration of around 20 mM. Advantageously, the capacity of the cell with said $Sn^{2+}$-containing electrolyte was found to be stabilized over a period of at least 600 cycles with an average Coulombic efficiency of about 99.5% and specific capacity of ~760 mAh/g at 0.5 C. The rate-behavior of the cell was also observed to be improved, where the cell can be operated stably over a period of at least 200 cycles at relatively high charging rates, for instance, 7 C or 9 C.

The additive may further comprise at least one halogen-containing anion. In one embodiment, the halogen containing anion is a monoatomic halogen anion. Preferably, the monoatomic halogen anion may be selected from the group consisting of $F^-$, $Cl^-$, and $Br^-$. More preferably, the monoatomic halogen anion may be $Cl^-$. In another embodiment, the halogen containing anion is a polyatomic anion. Preferably, the polyatomic anion may be selected from the group consisting of $SF_4^-$, $B(C_6F_5)_4^-$, $PF_6^-$, $ClO_4^-$ and $CF_3SO_3^-$. More preferably, the polyatomic anion may be $SF_4^-$.

The additive may be dispersed in a solvent comprising at least one alkyl carbonate. The alkyl carbonate may be a cyclic alkyl carbonate, a non-cyclic alkyl carbonate, or a combination thereof. In one embodiment, the cyclic alkyl carbonate is selected from the group consisting of fluoroethylene carbonate, ethylene carbonate, propylene carbonate, trimethylene carbonate, vinylene carbonate, and combinations thereof. Preferably, the cyclic alkyl carbonate may be fluoroethylene carbonate, ethylene carbonate or a combination thereof. In another embodiment, the non-cyclic alkyl carbonate is selected from the group consisting of dimethyl carbonate, ethyl methyl carbonate, diethyl carbonate, dibenzyl carbonate, diallyl carbonate, diphenyl carbonate, dipropyl carbonate, and combinations thereof. Preferably, the non-cyclic alkyl carbonate may be dimethyl carbonate. In a preferred embodiment, the alkyl carbonate may be a combination of fluoroethylene carbonate, ethylene carbonate and dimethyl carbonate.

The solvent may comprise a combination of two or more distinct alkyl carbonates. For instance, the solvent may comprise two or more carbonates selected from ethylene carbonate, dimethyl carbonate or fluoroethylene carbonate. In one embodiment, the solvent may comprise a mixture of ethylene carbonate and dimethyl carbonate, wherein the volume ratio of ethylene carbonate to dimethyl carbonate is selected from 2:1, 1.8:1, 1.5:1, 1.4:1, 1.3:1, 1.2:1, 1.1:1, 1:1 or in ranges therebetween. In another embodiment, the solvent may comprise a mixture of dimethyl carbonate and fluoroethylene carbonate, wherein the volume ratio of dimethyl carbonate to fluoroethylene carbonate is selected from 1:0.5, 1:0.4, 1:0.3, 1:0.2, 1:0.19, 1:0.18, 1:0.17, 1:0.16, or in ranges therebetween. In a preferred embodiment, the solvent comprises a mixture of three carbonates comprising ethylene carbonate, dimethyl carbonate and fluoroethylene carbonate, and wherein said carbonates may be provided in ratios selected from those defined above. In one embodiment, the volume ratio of ethylene carbonate, dimethyl carbonate and fluoroethylene carbonate is 1:1:0.16.

Advantageously, the solvent comprising alkyl carbonate may play a vital role in the electrolyte formulation. In one embodiment, the cells having electrolytes comprising alloying type additives and fluoroethylene carbonate were found to be highly stable and reversible. In particular, an average Coulombic efficiency of about 99.5% can be obtained after 600 cycles of continuous charge/discharge at 0.5 C rate. Moreover, a high specific capacity of ~760 mAh/g, which is ~62% of the initial capacity (~1230 mAh/g), can be retained after 600 cycles. The concentration of the alkyl carbonate in the electrolyte may be 0.2 mM to 1.5 mM. In one embodiment, the concentration of the alkyl carbonate in the electrolyte is 0.25 mM to 1.5 mM, 0.3 mM to 1.5 mM, 0.35 mM to 1.5 mM, 0.4 mM to 1.5 mM, 0.45 mM to 1.5 mM, 0.50 mM to 1.5 mM, 0.55 mM to 1.5 mM, 0.6 mM to 1.5 mM, 0.65 mM to 1.5 mM, 0.65 mM to 1.4 mM, 0.65 mM to 1.3 mM, 0.65 mM to 1.2 mM, 0.65 mM to 1.1 mM, 0.65 mM to 1.0 mM, 0.65 mM to 0.95 mM or 0.7 mM to 0.9 mM.

The electrolyte may comprise a sodium salt. The sodium salt may be selected from the group consisting of sodium perchlorate (NaClO4), sodium trifluoromethanesulfonate (NaOTf), sodium bis(fluorosulfonyl)imide (NaFSI) and sodium trifluoromethanesulfonimide (NaTFSI). In one embodiment, the sodium salt is sodium trifluoromethanesulfonimide (NaTFSI). In a preferred embodiment, the electrolyte is substantially free of water.

Advantageously, it was found that electrolytes which comprise sodium trifluoromethanesulfonimide, Na(TFSI) are more electrochemically stable. In particular, the specific capacity of sodium sulfur batteries which comprise Na(TFSI) salt was maintained at about 62% of its initial specific capacity even after 600 cycles. In comparison, electrolytes comprising a sodium bis(fluorosulfonyl)imide salt show a sharp decline to about 33% of its initial specific capacity after about 500 cycles.

Without being bound by theory, the anionic component of the electrolyte salt is thought to be important for the formation of a stable solid electrolyte interphase. In particular, it is thought that the NaTFSI electrolyte allows the formation of stable crystals or aggregate ion pairs in the solid electrolyte interphase which may facilitate efficient charge transfer over a sustained period. This may contribute to the electrochemical stability Na(TFSI)-based electrolytes.

The concentration of the sodium salt in the electrolyte may be 0.1 M to 5 M. In one embodiment, the concentration of the sodium salt in the electrolyte is 0.1 M to 4.5 M, 0.1 M to 4.0 M, 0.1 M to 3.5 M, 0.1 M to 3.0 M, 0.1 M to 2.5 M, 0.1 M to 2.0 M, 0.1 M to 1.5 M, 0.2 M to 1.5 M, 0.5 M to 1.5 M, 0.6 M to 1.5 M, 0.7 M to 1.5 M, 0.8 M to 1.5 M, 0.9 M to 1.5 M, 0.9 M to 1.4 M, 0.9 M to 1.3 M, 0.9 M to 1.2 M, or 0.9 M to 1.1 M. Preferably, the concentration of the sodium salt in the electrolyte may be 1.0 M.

A sodium-sulfur cell may comprise a sodium anode, a microporous sulfur cathode, and the electrolyte as described herein. The sodium anode may comprise a sodium alloy interphase, said sodium alloy being formed between a reduced metal/metalloid of the electrolyte and the sodium anode.

A method of improving cycling life of a sodium-sulfur cell, which comprises a sodium anode, a sulfur cathode, and an electrolyte containing a sodium salt dispersed in an alkyl carbonate solvent, may comprise the step of introducing one or more additives into said electrolyte, each additive independently capable of forming a sodium alloy interphase on a surface on the sodium anode; and wherein the one or more additives independently comprise a one metal or metalloid cation having a standard reduction potential which is at least 2.5V more positive than that of sodium cation.

BRIEF DESCRIPTION OF DRAWINGS

The accompanying figures, together with the description below are incorporated in and form part of the specification. These figures serve to illustrate various embodiments and to explain various principles and advantages in accordance with a present embodiment.

FIG. 1 is a schematic illustration of an exemplary sodium-sulfur cell as described herein.

FIG. 1a is an illustration of a sodium-sulfur cell without additive metal cations while

FIG. 2 is a X-ray photoelectron spectrum (XPS) of a sodium-tin alloy formed at the sodium anode of a sodium-sulfur cell.

FIG. 2a shows the presence of tin-species in the alloy, while FIG. 2b show the presence of sodium species in the alloy while

FIG. 3 is a XPS spectrum of a sodium-silver alloy interphase formed on a sodium anode of a sodium-sulfur cell.

FIG. 3a is a spectrum of the sodium species in the interphase while

FIG. 4c is the voltage profile of a sodium-sulfur cell fabricated with 1M NaTFSI in EC-DMC-FEC without additive metal cations while

FIG. 6a is a plot of the specific capacity of exemplary sodium-sulfur cells assembled with a 1M NaTFSI in EC-DMC-FEC electrolyte (volume ratio of 1:1:0.16) comprising various concentrations of silver tetrafluoroborate; while

FIG. 8a is a plot of the specific capacity of sodium sulfur cells comprising an electrolyte of various sodium salts at concentrations of 1M, dissolved in a EC-DMC-FEC system having 20 mM tin chloride; while

FIG. 9a is a plot of the specific capacity of sodium sulfur cells comprising an electrolyte having $BiCl_3$ or $SbCl_3$ dissolved in 1M NaTFSI in a EC-DMC-FEC system; while

EXAMPLES

Non-limiting examples of the invention will be further described in greater detail by reference to specific Examples, which should not be construed as in any way limiting the scope of the invention.

Example 1

Assembly of Electrochemical Cell

The electrolyte described herein was used in sodium sulfur cells. The sodium-sulfur electrochemical cell was assembled with a sodium metal anode and a sulfur-infused microporous carbon cathode having a surface area of approximately 1 $cm^2$, separated by a glass fibre separator having a thickness of about 25 μm, and 80 μl of an electrolyte. The electrolyte used in the sodium sulfur cells was a mixture of ethylene carbonate (EC), dimethylcarbonate (DMC) and fluoroethylcarbonate (FEC), having a concentration of 1M sodium trifluorosulfonimide, NaTFSI. The electrolyte was prepared by mixing 0.5 mL ethylene carbonate and 0.5 mL dimethyl carbonate and subsequently adding 80 μL fluoroethylene carbonate to the mixture.

Figure 1A:
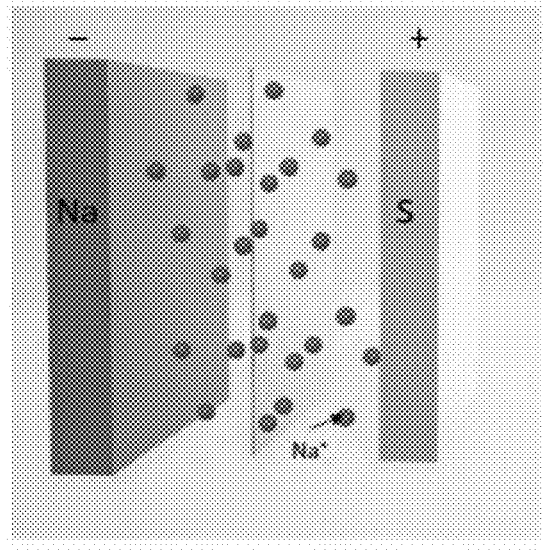
Figure 1B:
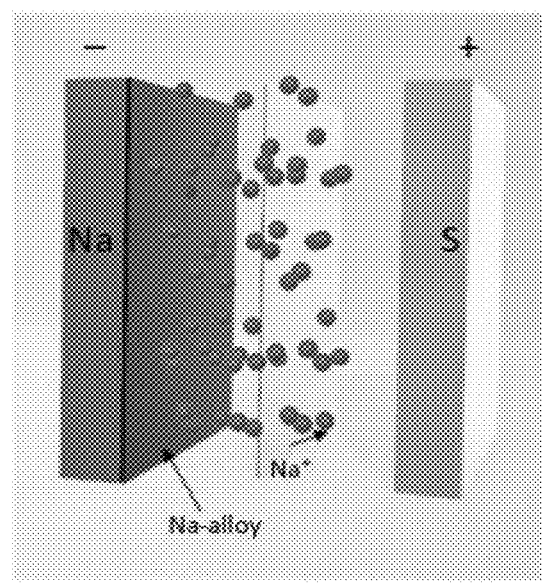
FIG. 1b depicts an exemplary sodium-sulfur cell comprising additive metal cations which may form an alloy interphase with the sodium anode.

Unless described otherwise, comparative cells were assembled with an electrolyte comprising 1M NaTFSI in EC-DMC-FEC without any additional salts, as shown in FIG. 1a. Electrolytes having additive metal ions were prepared by dissolving a salt of the additive metal ion in a 1 molar solution of a sodium salt in a EC-DMC-FEC system (volume ratio of 1:1:0.16). Electrochemical cells used for the studies below were assembled with the prepared electrolytes, as shown in FIG. 1b, where a Na-metal alloy may be formed with the additive metal ion at the sodium electrode.

Example 2

Evaluation of the Formation of the Alloy Interphase

The dissociation of $SnCl_2$ in an electrolyte and its interaction with sodium metal for the formation of a Na—Sn alloy was studied by X-ray photoelectron spectroscopy (XPS).

Figure 2A:
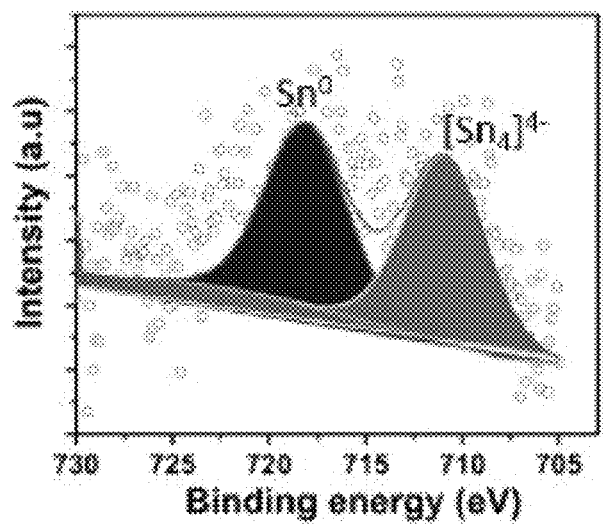
Figure 2B:
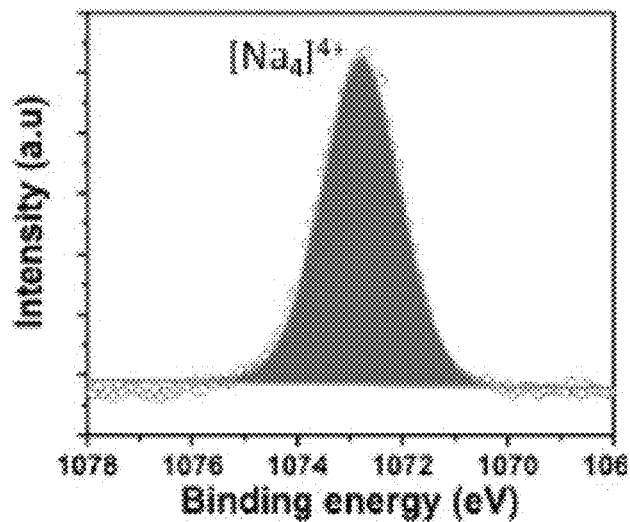
Figure 2C:
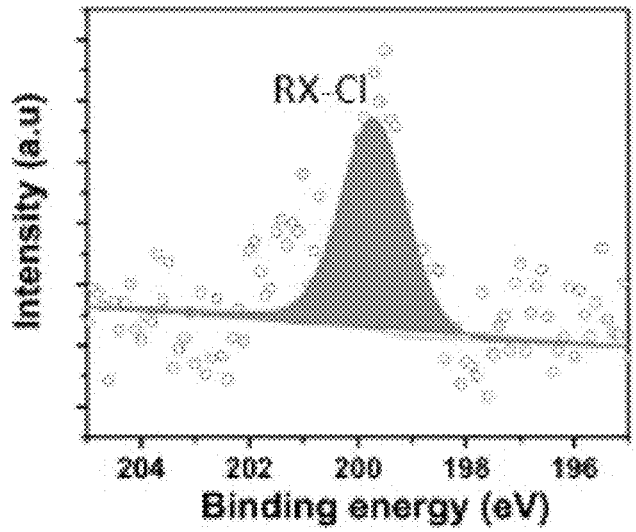
FIG. 2c shows the presence of chloride ions in the alloy.

X-ray photoelectron spectroscopy of the formation of an alloy between sodium and tin was studied. FIG. 2a demonstrates that besides the formation of metallic Sn, the $Sn^{2+}$ ions react with Na to form a Na—Sn alloy where, highly electronegative Sn form Zintl-ions preferentially, while electropositive Na stabilizes in the form of tetrahedral (FIG. 2b). The existence of $Cl^-$ as shown in FIG. 2c can be credited to the solvated chloride ions, which were formed during dissolution of $SnCl_2$ in the EC-DMC solvent (volume ratio of 1:1).

The formation of a sodium-metal alloy for electrochemical cells comprising a silver salt was also studied by XPS. The XPS spectra of the formed alloy is shown in FIG. 3.

Figure 3A:
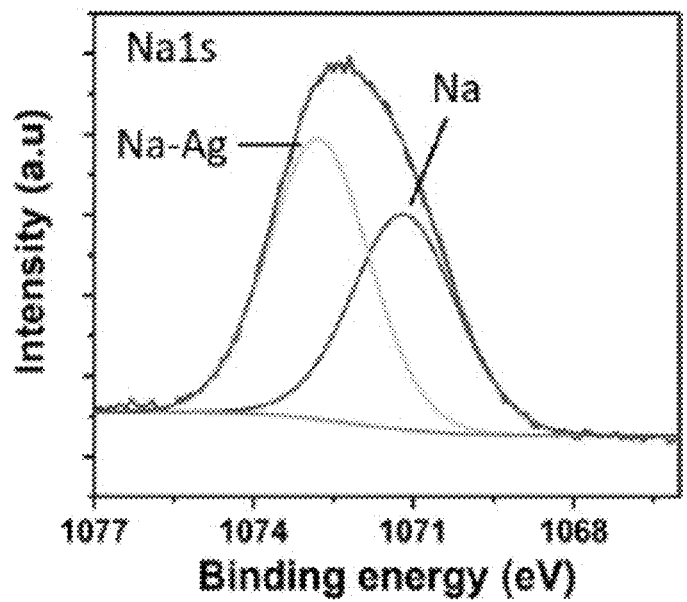
Figure 3B:
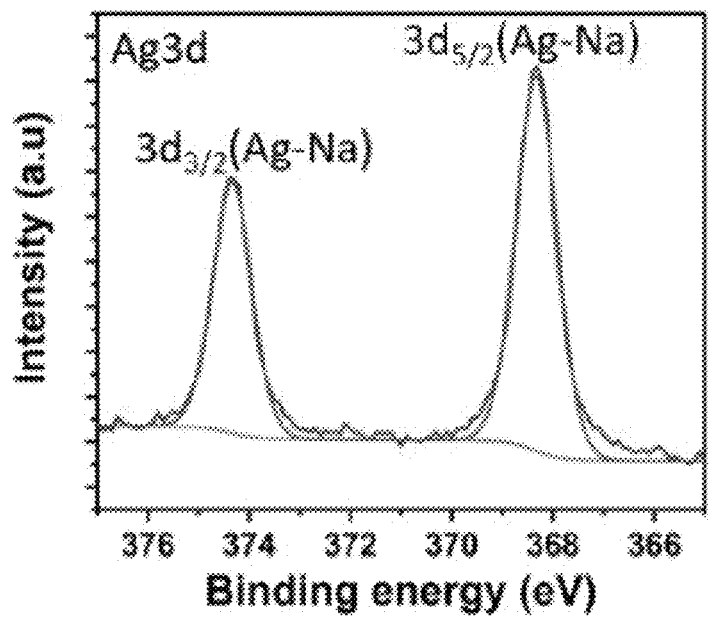
FIG. 3b is a XPS spectrum of silver species which are present in the interphase.
Figure 3C:
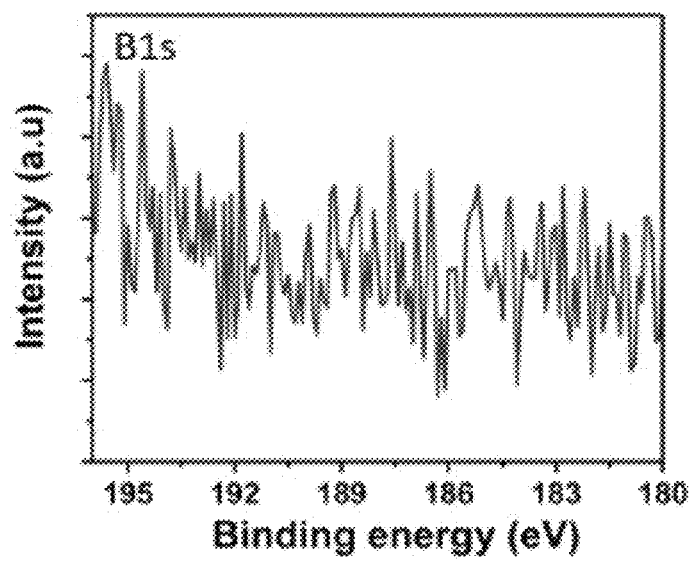
FIGS. 3c and 3d are spectra of boron and organic fluorine species in the alloy interphase, which show that the contribution of boron and fluorine species to the metal-alloy interphase is negligible.
Figure 3D:
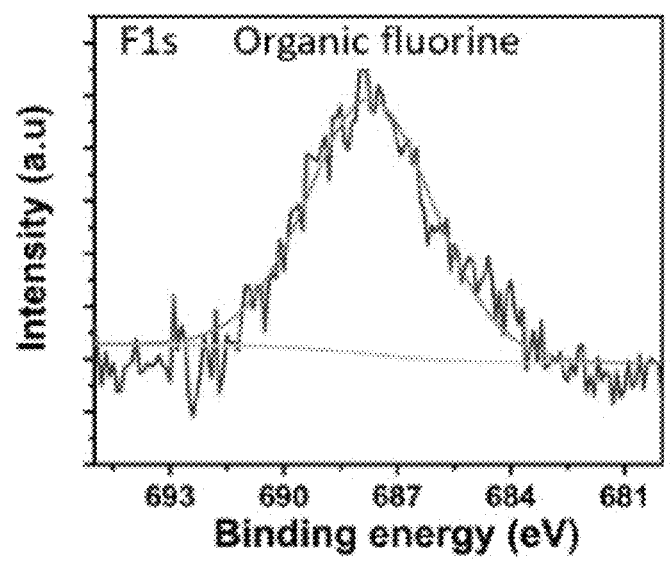

Apparent peaks can be assigned to Na or Na—F/Na—O (E=1071 eV), and Na—Ag alloy (E=1072.8 eV), as depicted in FIG. 3a. The existence of strong Ag doublets ensures formation of a stable Na—Ag alloy phase, as shown in FIG. 3b. The interphase involves mainly of Na—Ag alloys, as peaks corresponding to B and F are negligible. FIGS. 3c and 3d are XPS spectra of B and F, respectively, and a comparison between the spectrum of the sodium anode and the XPS spectra of B and F show that the contribution of B and F are negligible. The high-resolution XPS spectrum of F1s suggests trace amount of organic fluorides (E=687.4 eV) is present in the interphase, which could be due to solvated anions that remained on the surface of the anode.

Example 3

Performance of Sodium-Sulfur Cells Fabricated with Tin-Containing Electrolyte To evaluate the performance of the metal cation of the electrolyte additives, electrochemical characteristics such as specific energy and Coulombic efficiency of the assembled electrochemical cells were studied in the presence of the metal cations. In particular, the specific capacity and Coulombic efficiency of electrochemical cells with and without the additive metal cations were studied. The specific energy of electrochemical systems can be expressed in terms of specific capacity of the cell (energy=capacity×voltage), and the state of reversibility is expressed in terms of Coulombic efficiency.

The performance of an electrolyte comprising tin cations was first examined. The specific capacity and Coulombic efficiency of electrochemical cells fabricated with a 1M NaTFSI in EC-DMC-FEC (volume ratio of 1:1:0.16) electrolyte comprising 20 mM tin chloride was studied. This was compared to electrochemical cells comprising 1M NaTFSI in EC-DMC-FEC electrolyte system, without any additional salts.

Figure 4A:
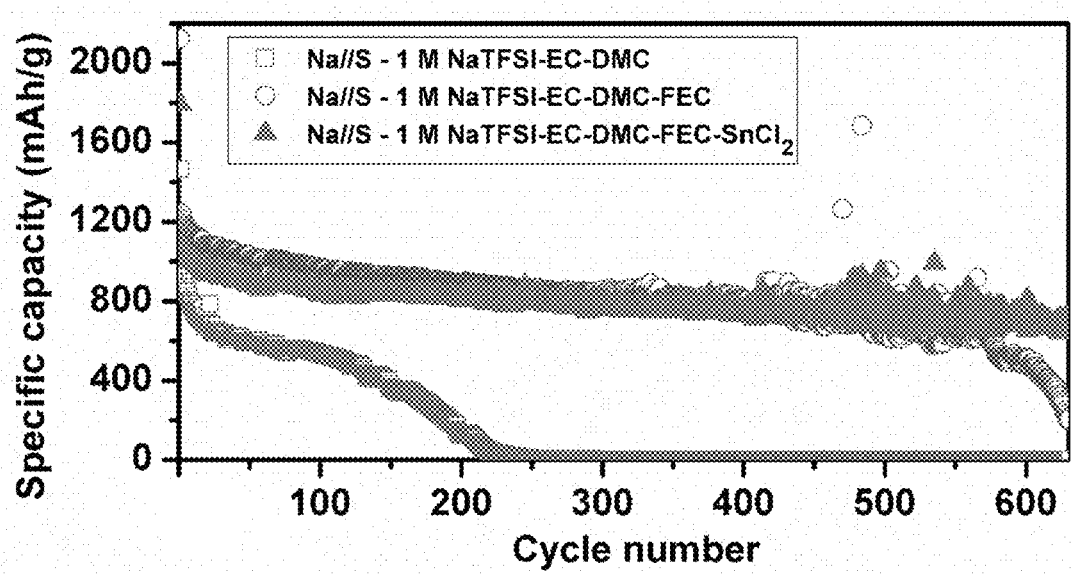
FIG. 4a is a plot which compares the specific capacity of an exemplary sodium-sulfur cell fabricated with a 1M NaTFSI salt in ethylene carbonate, dimethyl carbonate and fluoroethyl carbonate electrolyte (EC-DMC-FEC at a volume ratio of 1:1:0.16) system with and without the additive tin cations. For comparison, the specific capacity of the sodium sulfur cell fabricated with 1M NaTFSI in an EC-DMC electrolyte (volume ratio of 1:1) system is also shown.
Figure 4B:
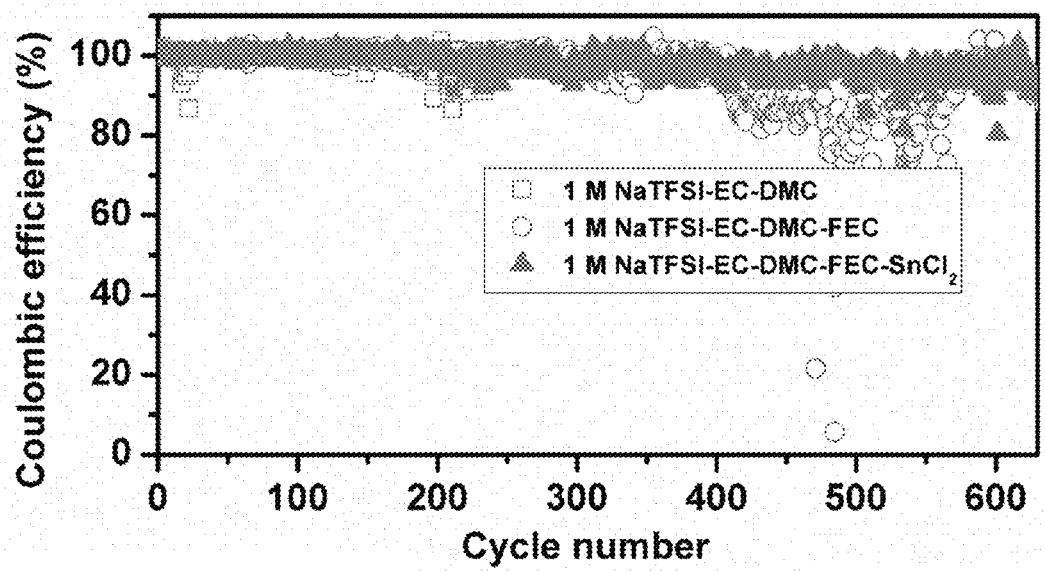
FIG. 4b compares the Coulombic efficiency of the sodium sulfur electrochemical cells fabricated with electrolytes provided with the additive tin cation and without the additive tin cations. As before, the Coulombic efficiency of a sodium sulfur cell with a 1M Na TFSI in a EC-DMC (1:1 volume ratio) is also shown.

The specific capacity of sodium-sulfur electrochemical cells assembled with tin additive additives was found to be higher and more stable over an extended period of time as compared to electrochemical cells comprising electrolytes without the tin additive, as depicted in FIGS. 4a and 4b. FIG. 4a shows that when tin chloride additives are added to the electrolyte, the specific capacity of the electrochemical cell remains stable even after 600 cycles. This may be observed in FIG. 4a, where a high specific capacity of ~760 mAh/g, which is ~62% of the initial capacity (~1230 mAh/g), is retained after 600 cycles. This is a marked improvement over an equivalent electrolyte system without any additives, where Coulombic efficiency decreases to less than 400 mAh/g after 600 cycles.

The use of tin chloride in the electrolyte of an electrochemical cell also results in an average Coulombic efficiency of about 99.5% even after 600 cycles, as shown in FIG. 4b. This indicates that an electrochemical cell fabricated with an electrolyte system having additives maintains its state of reversibility after multiple charge-discharge cycles.

Figure 4C:
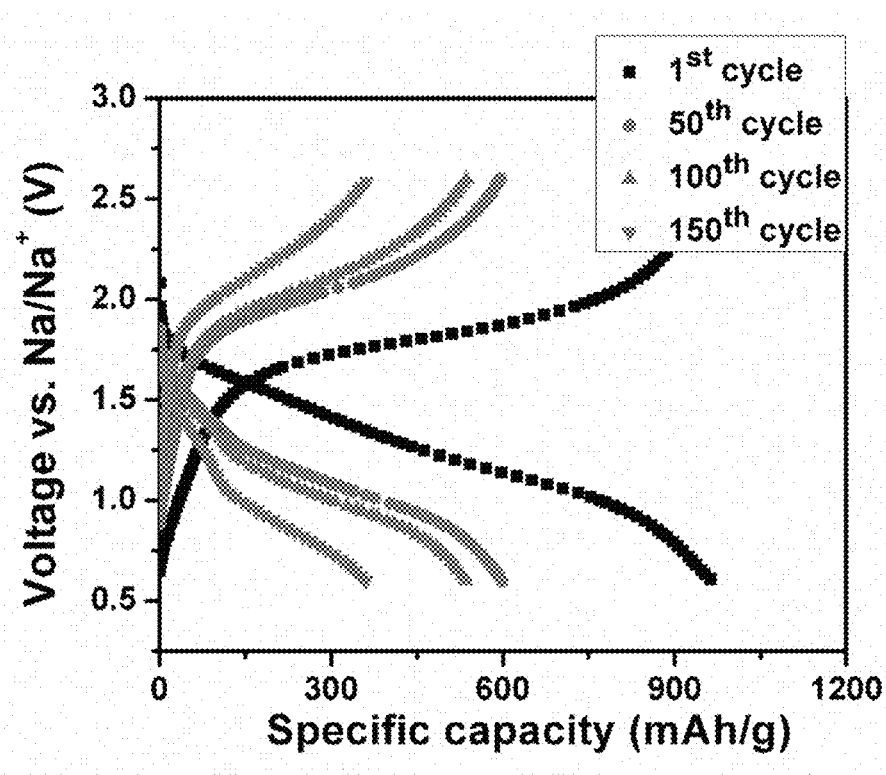
Figure 4D:
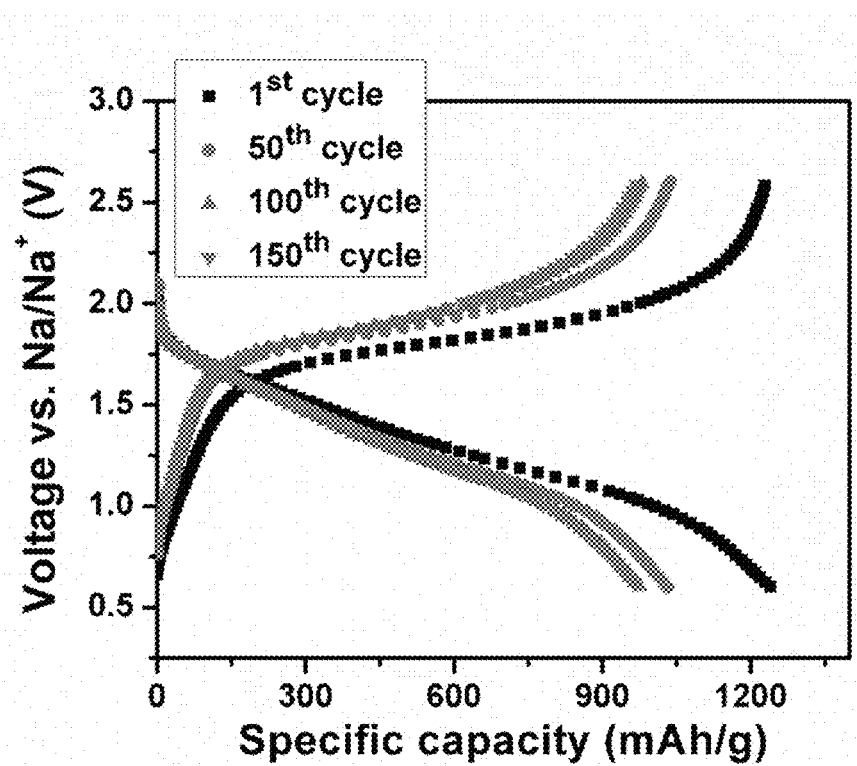
FIG. 4d is the voltage profile of an exemplary sodium-sulfur cell fabricated with 1M NaTFSI in EC-DMC-FEC with 20 mM of tin chloride.

The voltage profiles of sodium-sulfur cells fabricated with a 1M NaTFSI in EC-DMC-FEC (volume ratio of 1:1:0.16) electrolyte without alloying type additives exhibit a slight increase in overpotential as the number of cycles increase, as shown in FIG. 4c. However, traits of side reactions are observed during discharging process, and these may contribute to side reactions which may contribute to low Coulombic efficiency of electrochemical cells comprising electrolytes without additives, even in the presence of FEC. In contrast, the voltage profiles of sodium-sulfur cells fabricated using electrolytes comprising alloying additives exhibited minimal increase in overpotential with cycling, without occurrence of any side reactions as shown in FIG. 4d.

Figure 5A:
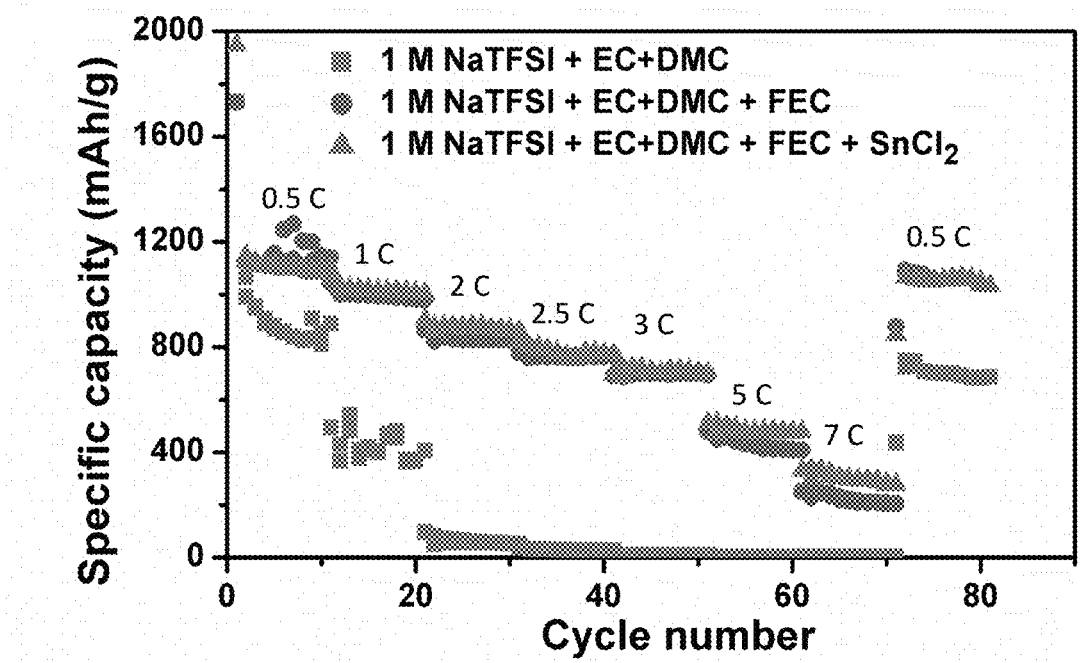
FIG. 5a is a comparative plot of the rate behaviour of sodium-sulfur cells fabricated with 1M NaTFSI in EC-DMC-FEC (volume ratio of 1:1:0.16) with or without 20 mM tin chloride. For comparison, the rate behaviour of a sodium-sulfur cell fabricated with 1M NaTFSI in EC-DMC at a volume ratio of 1:1 is also shown.
Figure 5B:
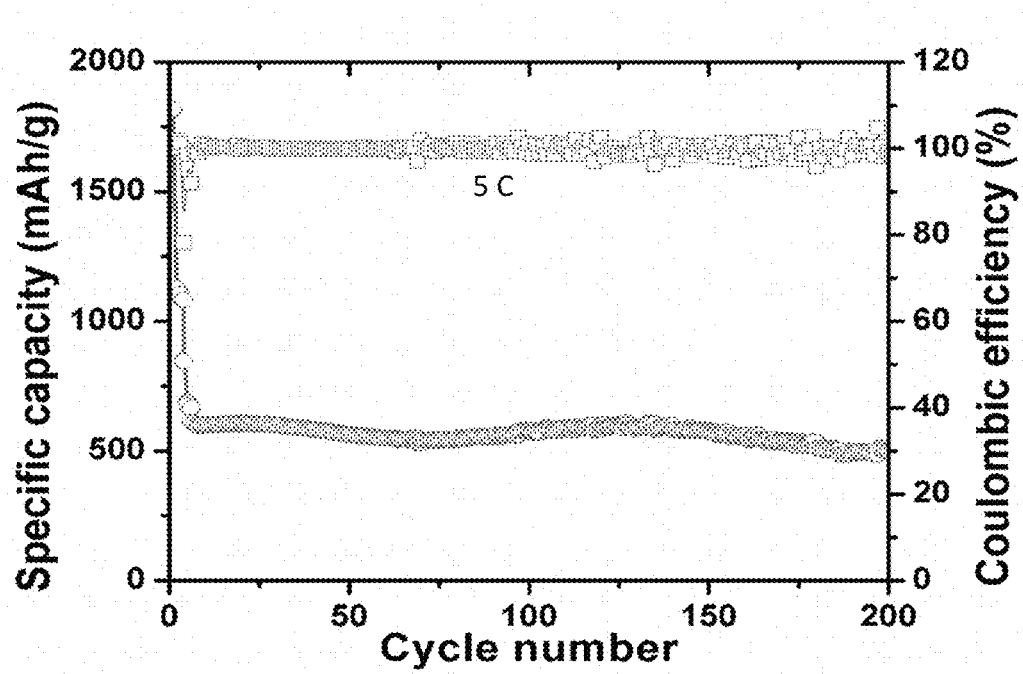
FIGS. 5b, 5c and 5d are plots of the rate behaviour of an exemplary sodium-sulfur cell assembled with the 1M NaTFSI in EC-DMC-FEC (volume ratio of 1:1:0.16) with 20 mM tin chloride at a charging rate of 5 C, 7 C and 9 C, respectively.
Figure 5C:
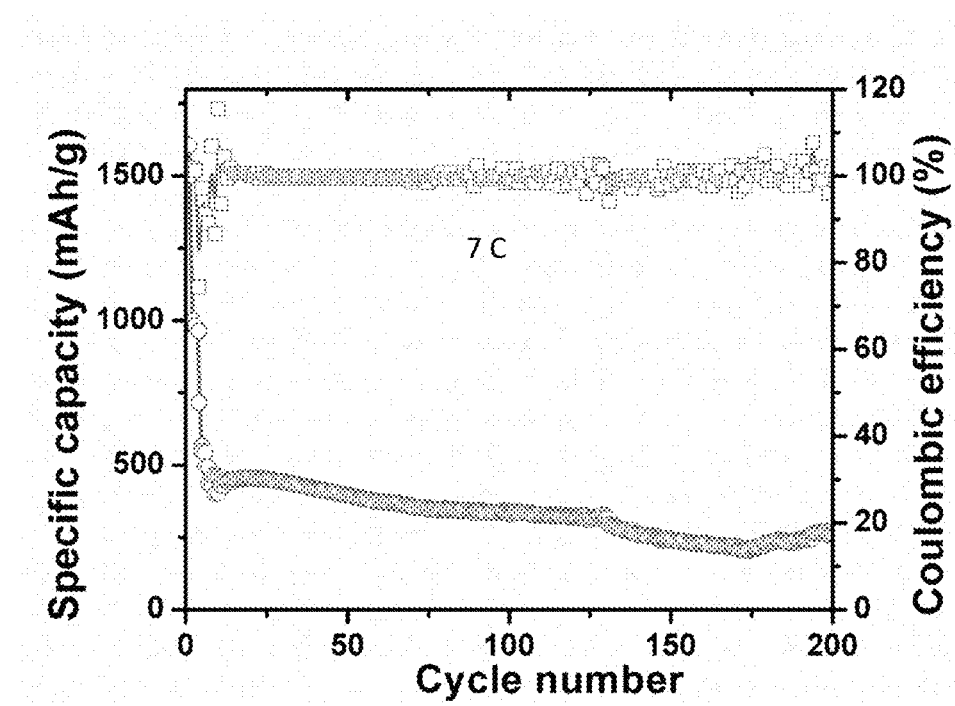
Figure 5D:
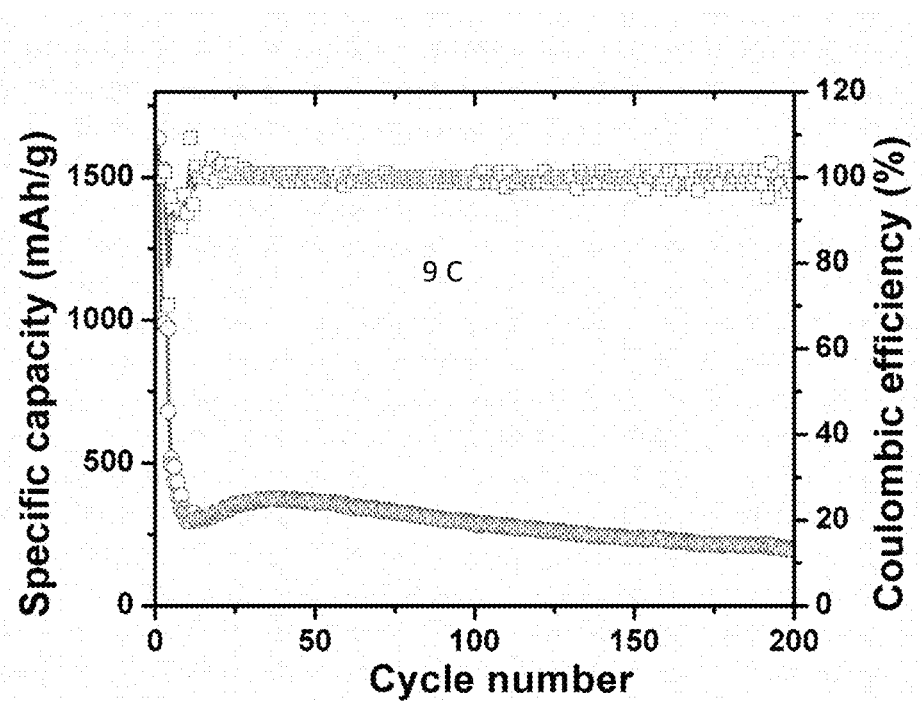

The rate-behaviour of Na/S cells was determined without and with additives, and identified that the inclusion of additives exerts a positive effect on the rate-behaviour, as depicted in FIG. 5a. As a consequence of additives, sodium-sulfur cells could attain a specific capacity of about ~500 mAh/g, ~320 mAh/g, and ~240 mAh/g, after 200 cycles at relatively high charge-rate, i.e., 5 C, 7 C and 9 C, respectively, as shown in FIGS. 5b-5d

Example 4

Performance of Sodium-Sulfur Cells Fabricated with Silver-Containing Electrolyte The performance of electrochemical cells comprising an electrolyte system having silver cations was also evaluated. The sodium-sulfur cell was fabricated according to Example 1 with a 1M NaTFSI in EC-DMC-FEC electrolyte comprising silver cations. Comparative sodium-sulfur cells were fabricated similarly, with a 1M NaTFSI in EC-DMC-FEC electrolyte (volume ratio of 1:1:0.16) without additive metal cations.

Figure 6A:
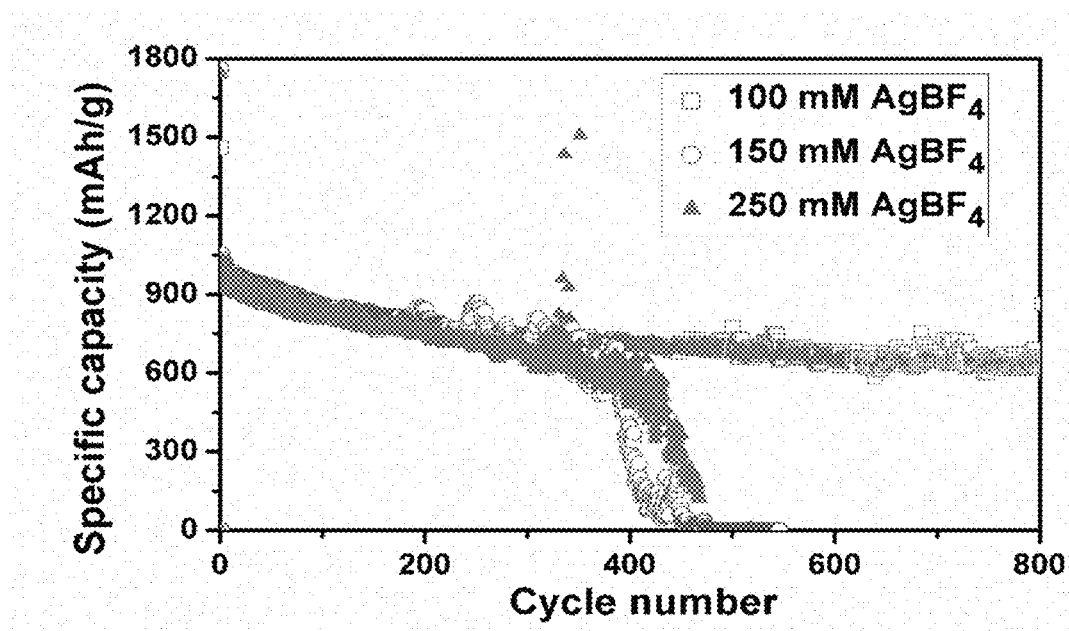
Figure 6B:
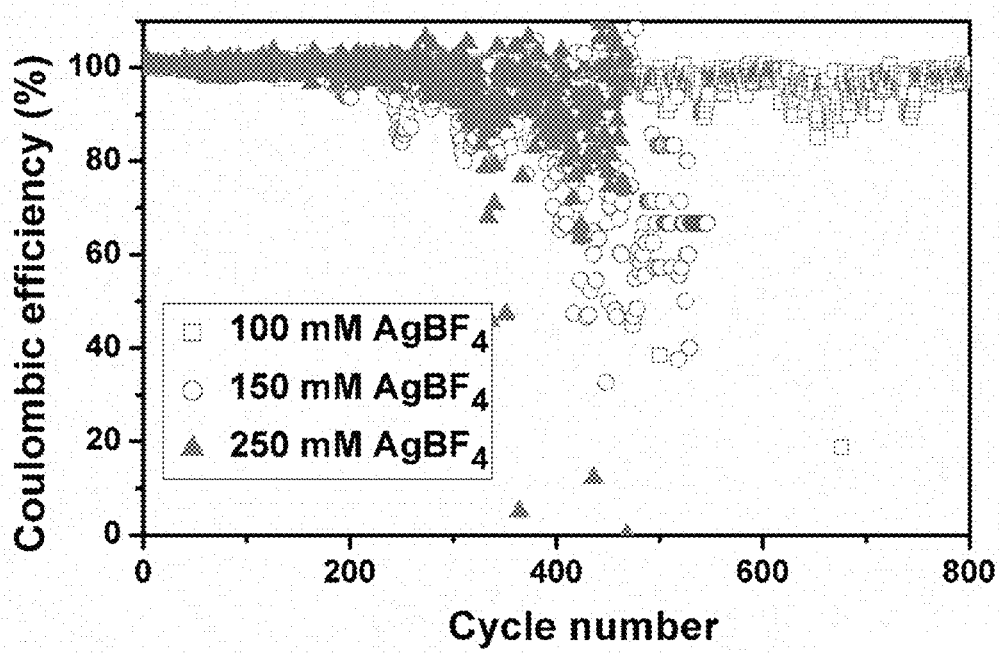
FIG. 6b is a plot of their respective Coulombic efficiencies. A comparison of the specific capacity and Coulombic efficiency of sodium-sulfur electrochemical cells with and without the addition of 100 mM $AgBF_4$ to the electrolyte is shown in FIGS. 6c and 6d, respectively.

To understand the effect of the metal cation on the performance of sodium-sulfur electrochemical cells, different concentrations of the additive metal cation were dissolved in the reference electrolyte system. It is observed that sodium-sulfur cells can function stably for 300 cycles, irrespective of the concentration of $AgBF_4$ (FIG. 6a). However, after 300 cycles, the specific capacity of sodium-sulfur cells containing 150 mM and 250 mM of the silver salt, declines sharply (FIG. 6a). This may be due to various reasons, for instance, undesirable side-reactions, sluggish diffusion of ion in the electrochemical cell and a thicker interphase region.

Figure 6C:
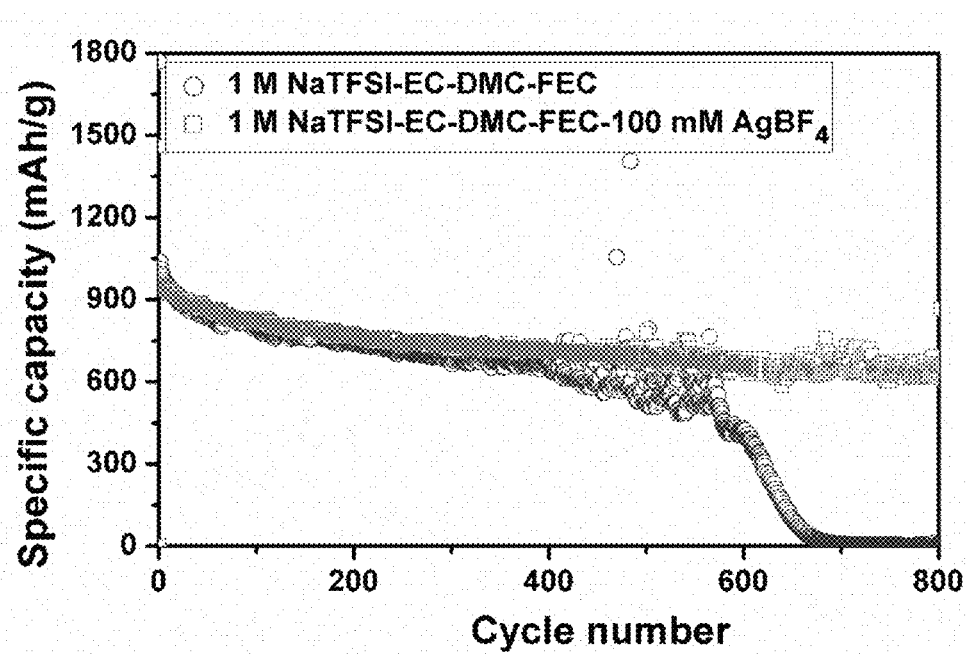
Figure 6D:
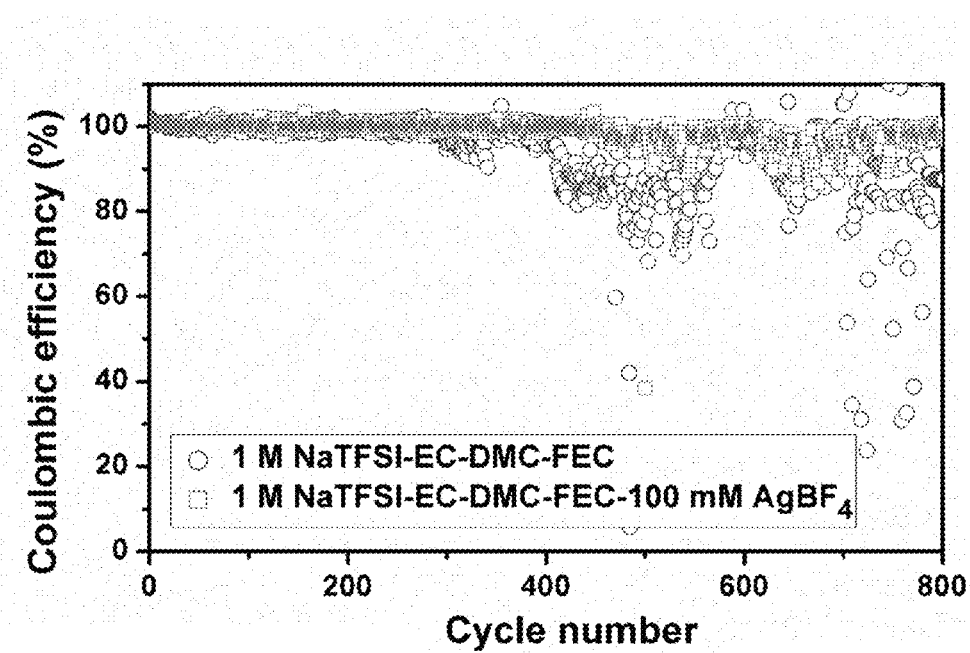

It was found that a silver additive concentration of 100 mM was highly favorable in achieving long-term cycling stability of sodium-sulfur cells, even after 800 cycles (FIG. 6c). The Coulombic efficiency of the sodium-sulfur cell containing an electrolyte comprising 100 mM of $AgBF_4$ was observed to be highly stable, and the Coulombic efficiency was calculated to be about 98.4% after over 800 cycles. As shown in FIGS. 6c and 6d, when a silver additive is added to the electrolyte, the specific capacity of the cell is markedly higher than electrochemical cells without the additive; and the average Coulombic efficiency is maintained at 98.4% after 800 cycles.

Figure 7A:
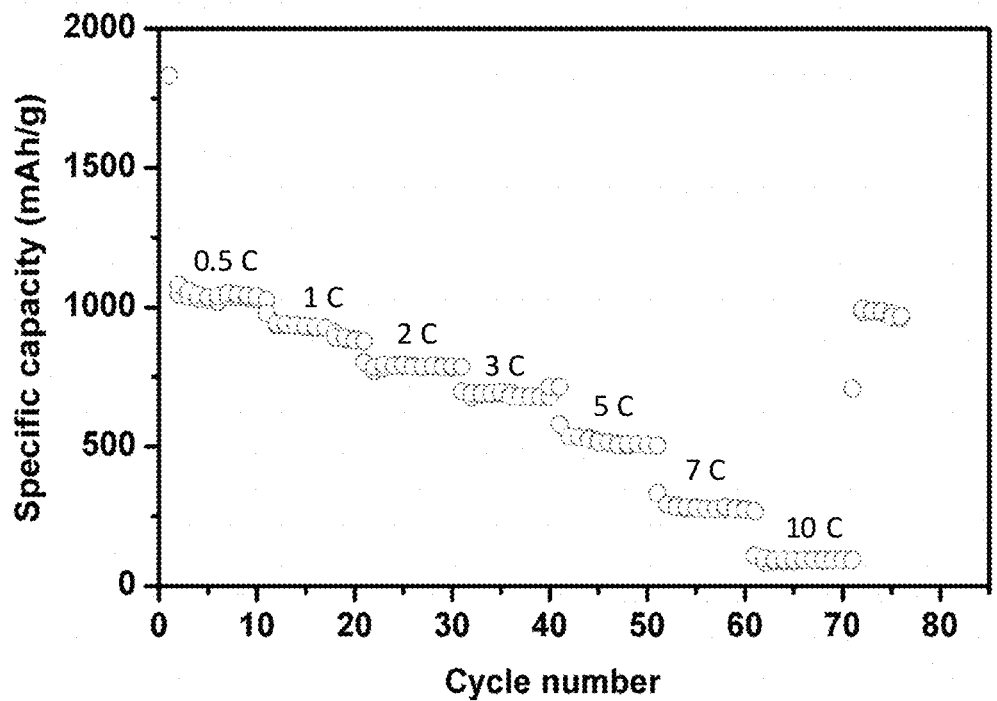
FIG. 7a is a plot of the rate behaviour of sodium-sulfur electrochemical cells fabricated with 100 mM $AgBF_4$ in a 1M NaTFSI in EC-DMC-FEC electrolyte (volume ratio of 1:1:0.16).
Figure 7B:
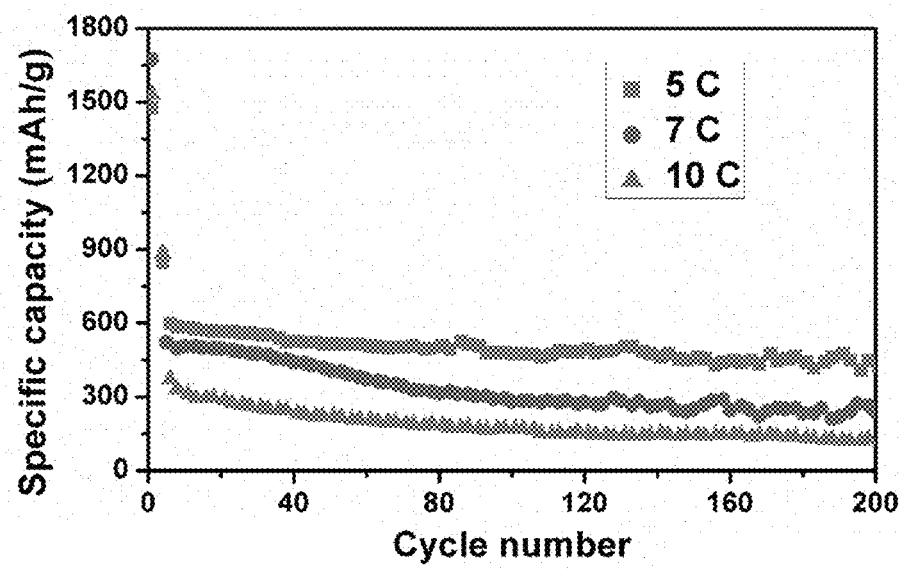
FIG. 7b is a plot of the specific capacity of exemplary sodium sulfur cells with a 1M NaTFSI in EC-DMC-FEC electrolyte having 100 mM $AgBF_4$ at high charge rates of 5 C, 7 C and 10 C.

The silver cation was also found to have a stabilizing effect on the formation of a localized sodium-silver interphase on the sodium metal electrode. This may be observed in the high specific capacity which is maintained at various charge rates, from 0.5 C to 10 C (FIG. 7a). Moreover, the sodium-sulfur cell fabricated with an electrolyte comprising a silver cation achieved a specific capacity of about 450 mAh/g, 260 mAh/g, and 131 mAh/g, after 200 cycles at relatively high charge-rates of 5 C, 7 C and 10 C, respectively, as shown in FIG. 7b.

Example 5

Influence of Electrolyte Salt on Performance of Electrochemical Cell

In order to investigate the role of electrolyte salt on the performance of the electrochemical cell, various sodium salts were used in the electrolyte. The sodium-sulfur electrochemical cell was then fabricated with electrolytes prepared with various sodium salts at a concentration of 1M in a EC-DMC-FEC solvent (volume ratio of 1:1:0.16) comprising tin chloride at a concentration of 20 mM. In particular, electrolytes comprising 1M sodium perchlorate (NaClO$_4$), 1M sodium trifluoromethanesulfonate (NaOTf), 1M sodium bis(fluorosulfonyl)imide (NaFSI), and 1M sodium trifluoromethanesulfonimide (NaTFSI) were prepared and used for the fabrication of sodium sulfur cells as detailed above.

Figure 8A:
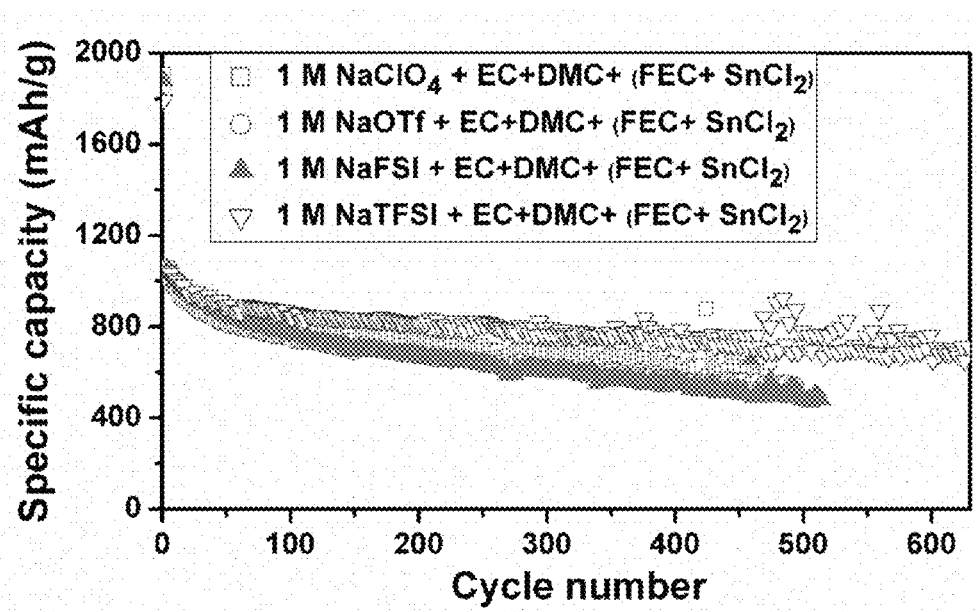
Figure 8B:
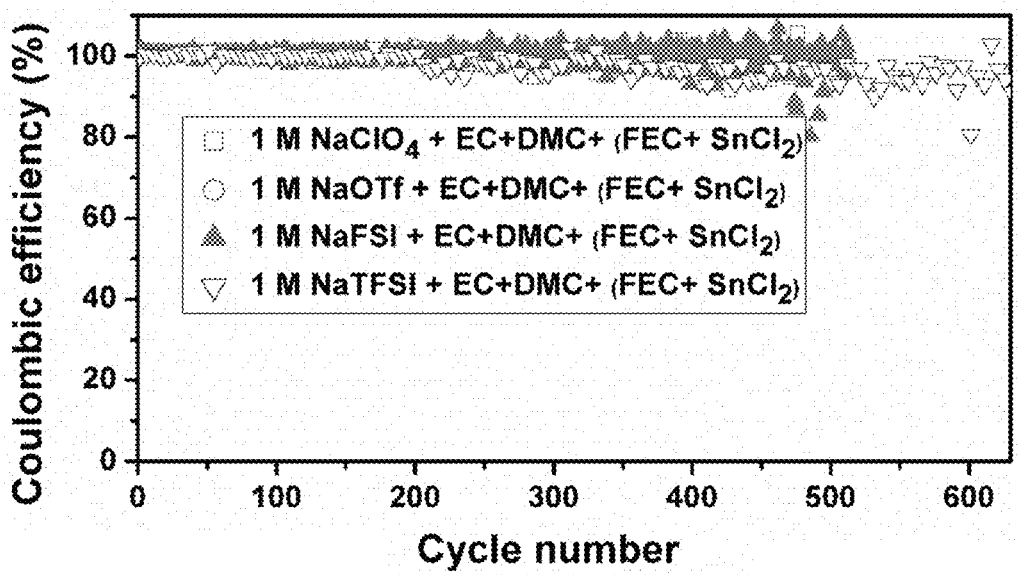
FIG. 8b is a plot of their respective Coulombic efficiencies.

It was found that the electrochemical stability of the cell is the highest in the presence of NaTFSI, as depicted in FIG. 8a. From FIG. 8b, it was observed that the Coulombic efficiency of the sodium-sulfur cells in the presence of various salts was found to be unaffected, which indicates that electrochemical reversibility is not associated with the salt system; and is therefore not affected by the different salts used in the electrolyte.

Example 6

Performance of Electrolytes Comprising Other Metal Cations

Figure 9A:
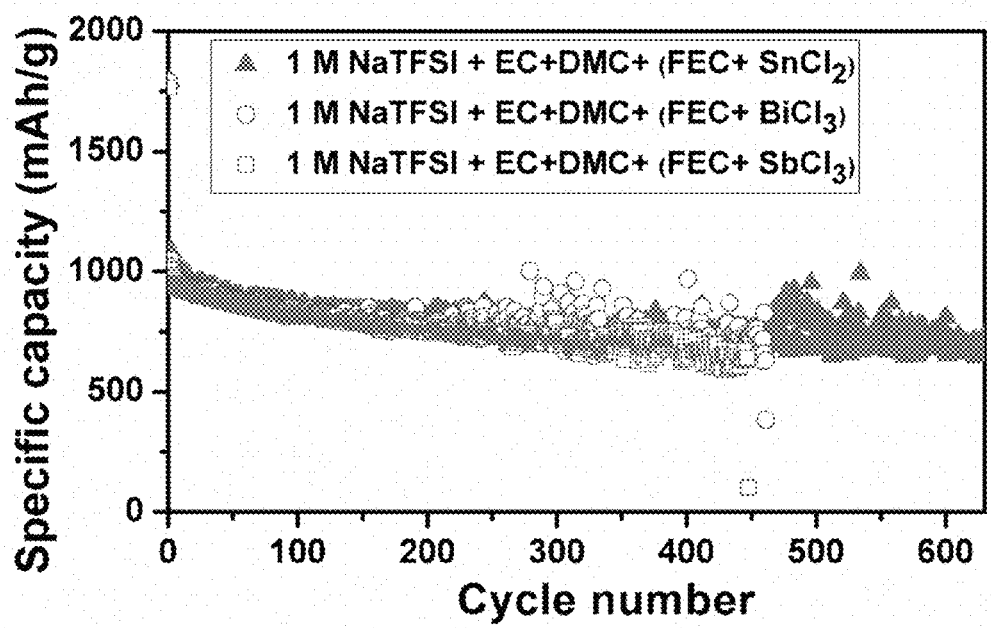

The electrochemical performance of electrolytes comprising other metal cations was also studied. Sodium-sulfur cells fabricated with electrolytes having BiCl$_3$, and SbCl$_3$, was also examined. It was observed that the stability of sodium-sulfur cells in the presence of different types of additives was also higher than electrochemical cells without the additives (FIG. 9a). The EC-DMC-FEC electrolyte system was prepared at a volume ratio of 1:1:0.16.

Figure 9B:
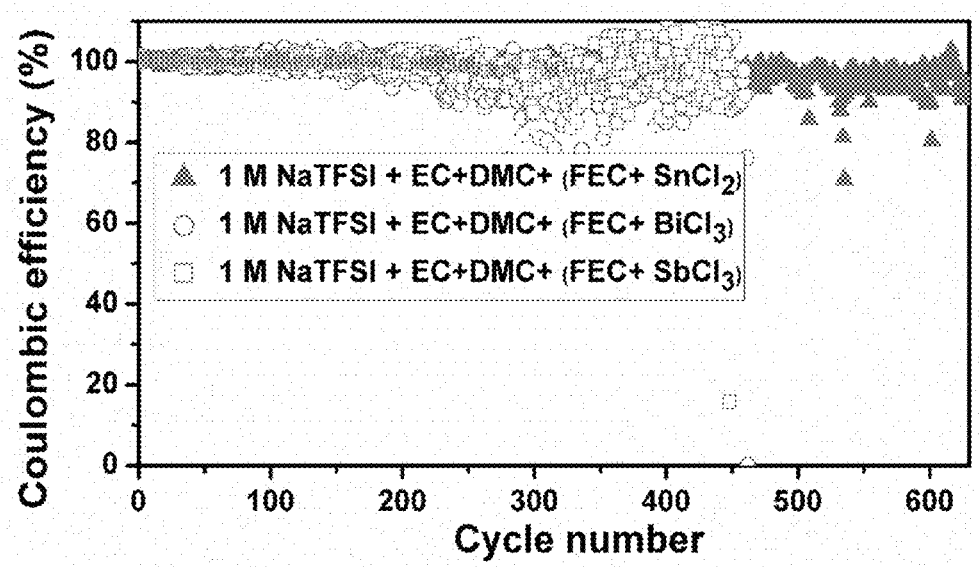
FIG. 9b is a plot of their respective Coulombic efficiencies.

It was also observed that the Coulombic efficiency is affected by the choice of additives, as depicted in FIG. 9b. The highest Coulombic of about 99.5% is obtained with 20 mM of SnCl$_2$ in 1 M NaTFSI-EC-DMC-FEC electrolyte system, 20 mM of BiCl$_3$ in 1 M NaTFSI-EC-DMC-FEC electrolyte system and 20 mM of SbCl$_2$ in 1 M NaTFSI-EC-DMC-FEC electrolyte system, respectively.

INDUSTRIAL APPLICABILITY

The electrolytes as described herein may be used for the fabrication of electrochemical cells, in particular, sodium-sulfur electrochemical cells. Due to their ability in stabilizing the reactive metal electrodes, such electrolytes may be used for the fabrication of stable sodium-based electrochemical cells.

When used for preparation of sodium-based electrochemical cells, the electrolyte may be used as a homogenous liquid mixture; or provided on an absorbent material which may be contacted with the electrodes in the cell. The ease of preparing the electrolytes also allows for convenient industrial preparation and assembly of electrochemical cells. Such electrochemical cells may be utilized as batteries in portable electronic devices.

What is claimed is:

1. An electrolyte comprising:
   a) a sodium salt;
   b) an additive comprising at least one additional metallic/metalloid cation having a standard reduction potential which is at least 2.5V more positive than that of sodium cation;
   wherein said sodium salt and said additive are dispersed in a solvent comprising at least one alkyl carbonate, and wherein the concentration of said metallic/metalloid cation in the electrolyte is 20 mM to 100 mM.

2. The electrolyte of claim 1, wherein the metallic/metalloid element of said metallic/metalloid cation is selected from Groups 11, 14 or 15 of the Periodic Table of Elements.

3. The electrolyte of claim 2, wherein said metallic/metalloid element is selected from the group consisting of silver, gold, and copper.

4. The electrolyte of claim 3, wherein the concentration of said metallic/metalloid cation in the electrolyte is 50 to 100 mM.

5. The electrolyte of claim 2, wherein said metallic/metalloid cation comprises a metal/metalloid element selected from the group consisting of tin, antimony, and bismuth.

6. The electrolyte of claim 5, wherein the concentration of said metallic/metalloid cation in the electrolyte is 20 to 50 mM.

7. The electrolyte of claim 1, wherein the additive comprises at least one halogen-containing anion.

8. The electrolyte of claim 7, wherein the halogen containing anion is a monoatomic halogen anion selected from group consisting of F$^-$, Cl$^-$, and Br$^-$.

9. The electrolyte of claim 7, wherein the halogen-containing anion is a polyatomic anion selected from the group consisting of BF$_4^-$, B(C$_6$F$_5$)$_4^-$, PF$_6^-$, ClO$_4^-$ and CF$_3$SO$_3^-$.

10. The electrolyte of claim 1, wherein the alkyl carbonate is a cyclic alkyl carbonate, a non-cyclic alkyl carbonate, or a combination thereof.

11. The electrolyte of claim 10, wherein the cyclic alkyl carbonate is selected from the group consisting of fluoroethylene carbonate, ethylene carbonate, propylene carbonate, trimethylene carbonate, vinylene carbonate, and combinations thereof.

12. The electrolyte of claim 10, wherein the non-cyclic alkyl carbonate is selected from the group consisting of dimethyl carbonate, ethyl methyl carbonate, diethyl carbonate, dibenzyl carbonate, diallyl carbonate, diphenyl carbonate, dipropyl carbonate, and combinations thereof.

13. The electrolyte of claim 1, wherein the concentration of the carbonate in the electrolyte is 0.2 mM to 1.5 mM.

14. The electrolyte of claim 1, wherein the sodium salt is selected from the group consisting of sodium perchlorate (NaClO4), sodium trifluoromethanesulfonate (NaOTf), sodium bis(fluorosulfonyl)imide (NaFSI) and sodium trifluoromethanesulfonimide (NaTFSI).

15. The electrolyte of claim 1, wherein the concentration of the sodium salt in the electrolyte is 0.1 M to 5 M.

16. The electrolyte of claim 1, wherein the electrolyte is substantially free of water.

17. A sodium-sulfur cell comprising:
a. a sodium anode;
b. a microporous sulfur cathode, and
c. an electrolyte comprising:
   i. a sodium salt;
   ii. an additive comprising at least one additional metallic/metalloid cation having a standard reduction potential which is at least 2.5V more positive than that of sodium cation;
   iii. wherein said sodium salt and said additive are dispersed in a solvent comprising at least one alkyl carbonate, and
   iv. wherein the concentration of said metallic/metalloid cation in the electrolyte is 20 mM to 100 mM.

18. The sodium-sulfur cell of claim 17, wherein the sodium anode comprises a sodium alloy interphase, said sodium alloy being formed between a reduced metal/metalloid of the electrolyte and the sodium anode.

19. A method of improving cycling life of a sodium-sulfur cell, wherein the sodium-sulfur cell comprising a sodium anode, a sulfur cathode, and an electrolyte containing a sodium salt dispersed in an alkyl carbonate solvent, the method comprising:
introducing one or more additives into said electrolyte, each additive independently capable of forming a sodium alloy interphase on a surface on the sodium anode; and
wherein the one or more additives independently comprise at least one metal or metalloid cation having a standard reduction potential which is at least 2.5V more positive than that of sodium cation; and wherein the at least one metal or metallic cation is provided in a concentration of 20 mM to 100 mM.

* * * * *